May 17, 1938.  E. WEBER  2,117,585
CONTAINER FOR HOT AND COLD LIQUIDS
Filed June 8, 1937
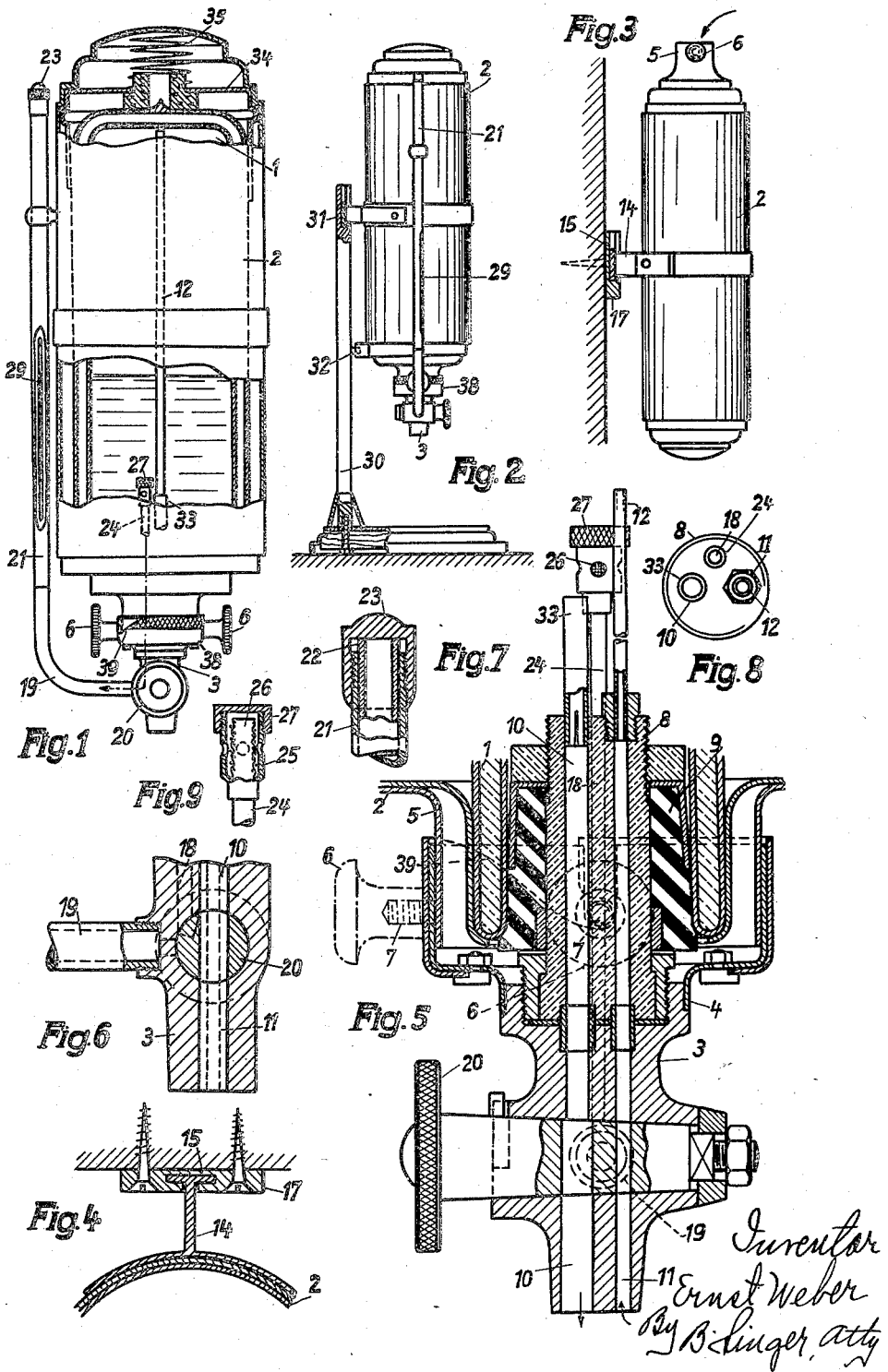

Patented May 17, 1938

2,117,585

UNITED STATES PATENT OFFICE 2,117,585

CONTAINER FOR HOT AND COLD LIQUIDS

Ernst Weber, Zollikon/Zurich, Switzerland, assignor to Matthey & Braendle, Zurich, Switzerland, a corporation of Switzerland Application June 8, 1937, Serial No. 147,118
In Switzerland September 21, 1936

5 Claims. (Cl. 215—13)

The present invention relates to liquid containing and dispensing apparatus and it has for its main object to provide a container for hot or cold fluids, such as hot coffee, which container may be used for dispensing small portions of its contents, whereby it is particularly suitable for use in restaurants, boarding houses or the like, in which the provision, for example, of a coffee machine is not worth while.

The improved dispensing container comprises a vacuum heat insulating flask for the reception of the liquid, for example coffee, which may for example hold 3-15 litres of coffee. The insulating receptacle is enclosed by a protecting cover, which is provided with a supporting fitting, whereby the cylindrical container may be mounted with either end upwards, for example, on a wall, or may be removably mounted in a stand. The protecting casing carries in addition a dispensing cock, which advantageously is combined with a liquid level indicator, the cock is removably connected with the casing and carries a stopper which completely seals the insulating receptacle.

In order that, for example, coffee, or in summer cold liquids, may retain their temperature as long as possible, care must be taken that the cock is insulated, so that the coffee or other liquid is not in connection through metal parts with the dispensing cock, whereby the heat cannot escape.

The invention is illustrated by the accompanying drawing, showing one constructional example thereof, in which:—

Fig. 1 is a side view of the dispensing container, partly in section through the dispensing portion.

Fig. 2 is a general view to a smaller scale with the container arranged on a stand.

Fig. 3 shows a container arranged on a wall in the filling position.

Fig. 4 shows means for fastening the container to a wall.

Figs. 5-9 are detail views in section.

The container shown consists of a vacuum insulating flask 1 which can hold 3 to 15 litres of coffee. The cylindrical insulating flask is mounted in a cylindrical protecting casing 2. The latter carries a removable dispensing cock 3, which is mounted on the neck 5 of the protecting casing 2, by means of a coupling sleeve 4. A ring 38 rotatably mounted on the coupling sleeve 4 has two notches 39 opposite to one another. On rotating the same two screw bolts 7 engage in the latter and hold the coupling sleeve securely in its position. For additional safety of the coupling sleeve two clamping nuts 6 are also provided which are mounted on the screw bolts 7 on the neck 5.

The coupling sleeve 4 has slots in which the bolts 7 engage. On the dispensing cock 3 is fastened a bush 8 consisting of heat insulating material, as for example, hard rubber. On the bushing 8 is mounted the soft rubber stopper 9 with which the mouth-piece of the flask can be tightly closed.

The bushing 8 and the dispensing cock 3 have two bores of which one 10, serves for the dispensing of the fluid and the other 11 for the inlet of air, whilst the third bore 18 (Fig. 8) is connected with a communicating tube 19 which serves as a liquid level indicator. To the bore 11 is connected a tube 12, which extends close to the bottom of the receptacle 1. The tube 33 connected to the bore 10 is provided for the purpose of preventing coffee dregs or cold coffee from flowing out. A tube 24 inserted in the bore 18 carries at the upper end 25a strainer 26, which is covered over by means of a cap nut 27 and prevents coffee grouts from entering the liquid level indicator (Fig. 9). At about the middle the casing 2 has a holder 14 with a T-shaped head 15. This head fits into a correspondingly shaped groove in a disc 17, fastened to the wall. The head 15 and the disc 17 are so constructed that the container may be hung on the wall with its mouth-piece directed upwardly or downwardly as may be desired.

Coffee is introduced into the container whilst it is in the position shown in Fig. 3, and then the dispensing cock 3 is inserted. The container is rotated and hung up in the position shown in Fig. 1.

The operating cock 20 can assume two different positions, i. e. it can close or open the pipes 10 and 11 as well as 18 with the communicating tube 19, and this by a quarter turn of the cock 20. The tube 19 consists as to its straight part 21 of a metal tube with an inserted glass tube 22 (Fig. 7). 21 indicates the metal tube, 22 the inserted glass tube and 23 a cap nut which seals up the tube. The tube 21 has a cut away portion 29 at which the condition and level of the liquid in the container 1 can be seen at any time if the cock 20 is given a quarter turn.

In Fig. 1 is shown a constructional form, in which the cap 34 on the flask is intended to act as a guide between the flask and the housing. The spring 35 should exert a steady pressure on the flask, and so of the flask against the stopper, and not as is usual in thermon flasks, against the housing.

In Fig. 2 is shown a constructional form in which the holder 2 is mounted on a stand 39. The arrangement is preferably such that the holder 3 is rotatable about the point 31 and can be held securely in its vertical position by a clip or the like 32.

The coffee can now in the course of the day be dispensed in small quantities, whilst being maintained hot. Instead of coffee, tea, hot water, or hot milk may be stored up as well as any cold fluid.

The dispensing container enables coffee to be kept warm for about 30 hours, without loss of flavour.

It should be understood that changes in the details of construction, proportion of parts, etc., may be made by those skilled in the art without departing from the spirit of the invention or the scope of the appended claims.

What I claim is:—

1. A dispensing receptacle for hot and cold liquids comprising an insulated container surrounded by a protective jacket, said container having a throat with an opening through which the container can be filled and emptied, a dispensing cock, means removably securing said cock to said jacket, a bush of heat-insulating material carried by said cock and projecting into said opening, and heat-insulating means for sealing said bush in said throat, said cock and its bush having a liquid-passing conduit and an air-passing conduit and including a valve for controlling said conduits.

2. A dispensing receptacle for hot and cold liquids comprising an insulated container surrounded by a protective jacket, said container having a throat with an opening through which the container can be filled and emptied, a dispensing cock, means removably securing said cock to said jacket, a bush of heat-insulating material carried by said cock and projecting into said opening, and heat-insulating means for sealing said bush in said throat, said cock and its bush having a liquid-passing conduit and an air-passing conduit and including a valve for controlling said conduits, said cock and its bush also having a third conduit, and a liquid-level gauge connected to said third conduit outside said container, said valve also having means to control said third conduit.

3. A dispensing receptacle for hot and cold liquids, comprising a "thermos" type container having a neck through which the container may be filled and emptied, a dispensing device comprising a bush of hard heat-insulating material surrounded by a soft rubber stopper located in said neck as a plug, a cock carried by said bush at its outer end, a protective jacket surrounding said container, and means detachably connecting said cock to said jacket to hold said plug in place, said cock including a valve with ports, said cock and said bush having a liquid conduit and an air conduit controlled by the positions of the ports in said valve for drawing off the liquid contents of said container.

4. A dispensing receptacle for hot and cold liquids, comprising a "thermos" type container having a neck through which the container may be filled and emptied, a dispensing device comprising a bush of hard heat-insulating material surrounded by a soft rubber stopper located in said neck as a plug, a cock carried by said bush at its outer end, a protective jacket surrounding said container, means detachably connecting said cock to said jacket to hold said plug in place, said cock including a valve with ports, said cock and said bush having a liquid conduit and an air conduit controlled by the positions of the ports in said valve for drawing off the liquid contents of said container, said cock also having a third liquid conduit controlled by said valve, a liquid-level gauge on the outside of said receptacle, and a duct connecting said gauge with the third conduit of said cock.

5. A dispensing receptacle for hot and cold liquids, comprising a "thermos" type container having a neck through which the container may be filled and emptied, a dispensing device comprising a bush of hard heat-insulating material surrounded by a soft rubber stopper located in said neck as a plug, a cock carried by said bush at its outer end, a protective jacket surrounding said container, means detachably connecting said cock to said jacket to hold said plug in place, said cock including a valve with ports, said cock and said bush having a liquid conduit and an air conduit controlled by the positions of the ports in said valve for drawing off the liquid contents of said container, said means for detachably connecting the cock to the jacket comprising a ring mounted on said cock and embracing the adjacent portion of said jacket, said ring having, at two diametrically opposite points, wedge-shaped ledges extending on the outer face from the margin inwardly and terminating in notches, said jacket having screw bolts which are adapted to be slidably engaged by said wedge shaped projections when the dispensing device is applied and removed, and clamping nuts on said bolts adapted to press said ring against said protective jacket.

ERNST WEBER.